United States Patent
Stauss et al.

(10) Patent No.: US 10,372,105 B2
(45) Date of Patent: Aug. 6, 2019

(54) DRIVE DEVICE WITH A MOVEMENT SENSOR WHICH DETECTS COMPONENT DATA

(71) Applicant: FESTO AG & Co. KG, Esslingen (DE)

(72) Inventors: Thomas Stauss, Stuttgart (DE); Martin Fuss, Uhingen (DE); Michael Schottner, Wendlingen (DE)

(73) Assignee: FESTO AG & Co. KG, Esslingen (DE)

( * ) Notice: Subject to any disclaimer, the term of this patent is extended or adjusted under 35 U.S.C. 154(b) by 244 days.

(21) Appl. No.: 15/534,609

(22) PCT Filed: Dec. 11, 2014

(86) PCT No.: PCT/EP2014/003313
§ 371 (c)(1),
(2) Date: Jun. 9, 2017

(87) PCT Pub. No.: WO2016/091271
PCT Pub. Date: Jun. 16, 2016

(65) Prior Publication Data
US 2017/0322541 A1    Nov. 9, 2017

(51) Int. Cl.
*G05B 19/18* (2006.01)
*G05B 19/4062* (2006.01)
(52) U.S. Cl.
CPC ......... *G05B 19/4062* (2013.01); *G05B 19/18* (2013.01); *G05B 2219/25294* (2013.01); *G05B 2219/33114* (2013.01)

(58) Field of Classification Search
CPC .................................................. G05B 19/4062
USPC ......................................................... 318/3, 34
See application file for complete search history.

(56) References Cited

U.S. PATENT DOCUMENTS 7,781,993 B1 *   8/2010  Faizullabhoy ............ H02P 5/06
                                                         318/135

FOREIGN PATENT DOCUMENTS

| DE | 60100078 T2 | 6/2003 |
| DE | 102006031645 | 1/2007 |
| DE | 102008013088 | 9/2009 |

* cited by examiner

*Primary Examiner* — David Luo
(74) *Attorney, Agent, or Firm* — Hoffmann & Baron, LLP

(57) ABSTRACT

A drive device for providing a drive movement, including a drive motor designed to convert provided electric or fluidic energy into a movement of a motor element, further including a drive sensor assigned to the drive motor and designed to detect the movement of the motor element and to provide a drive sensor signal, and further including a transmission device coupled to the drive motor and designed to convert the movement of the motor element into a drive movement of a drive element, wherein the transmission device is assigned a movement sensor for the detection of the drive movement, the movement sensor being electrically connected to the drive sensor The movement sensor is assigned a detection device designed for the detection of component data and for the provision of detected component data to the movement sensor.

16 Claims, 1 Drawing Sheet

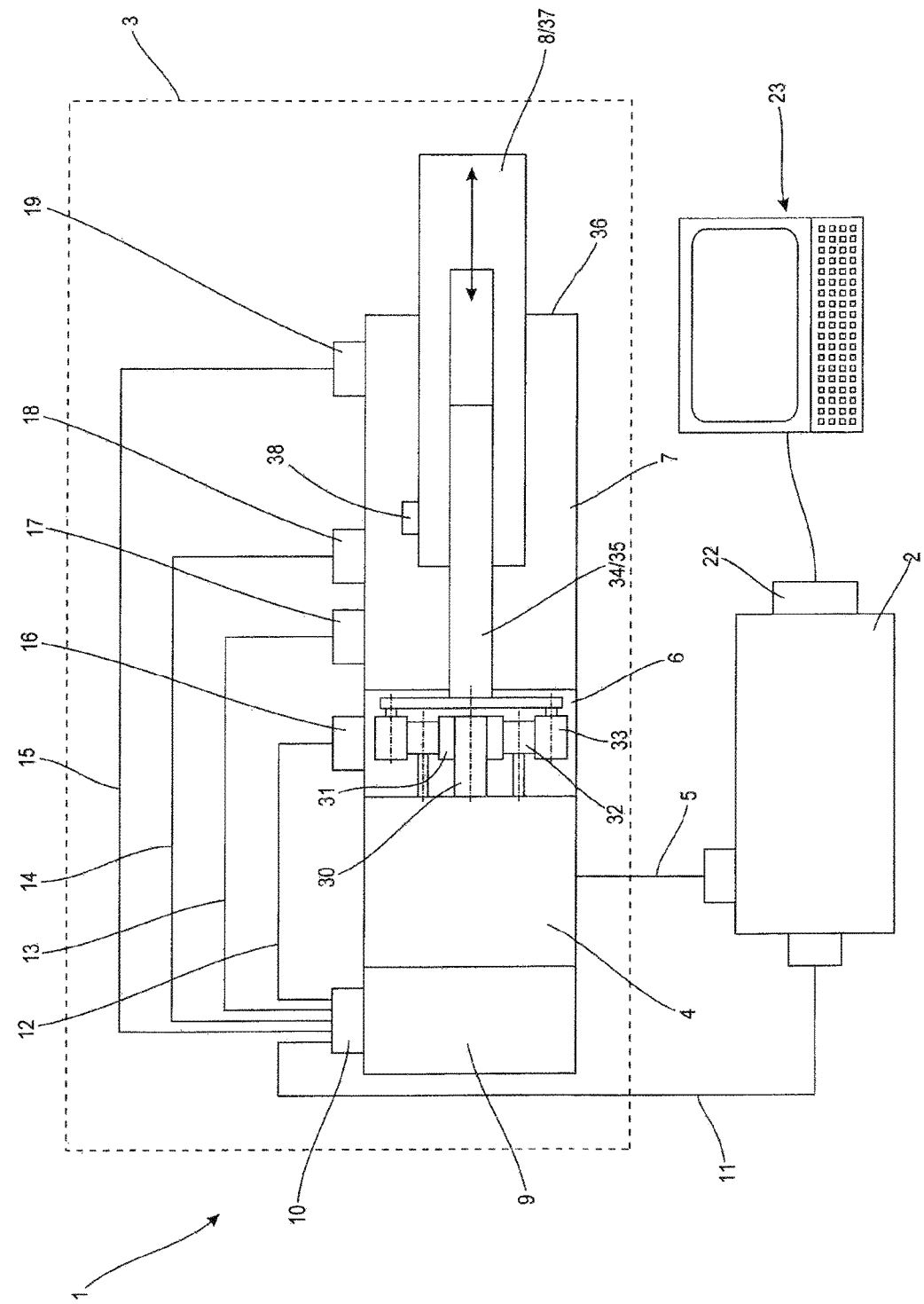

DRIVE DEVICE WITH A MOVEMENT SENSOR WHICH DETECTS COMPONENT DATA

This application claims priority based on an International Application filed under the Patent Cooperation Treaty, PCT/EP2014/003313, filed Dec. 11, 2014.

BACKGROUND OF THE INVENTION

The invention relates to a drive device for providing a drive movement, comprising a drive motor designed to convert provided electric or fluidic energy into a movement of a motor element, further comprising a drive sensor assigned to the drive motor and designed to detect the movement of the motor element and to provide a drive sensor signal, and further comprising a transmission device coupled to the drive motor and designed to convert the movement of the motor element into a drive movement of a drive element, wherein the transmission device is assigned a movement sensor for the detection of the drive movement, the movement sensor being electrically connected to the drive sensor.

From DE 10 2008 013 088 A1, a method for the start-up of a linear movement device with a transmission unit converting a rotary movement into a straight linear movement is known. The linear movement device comprises an electric motor connected for rotary drive to the transmission unit and a control unit connected to the electric motor via an electric connection, wherein the linear movement device is provided with at least one data memory which can be read out by the control unit. In the data memory, data on the transmission unit are stored; these data can be read out by the control unit during the start-up of the linear movement device.

SUMMARY OF THE INVENTION

The invention is based on the problem of providing a drive device which facilitates an improved start-up.

For a drive device of the type referred to above, this problem is solved by the following features: drive device for providing a drive movement, comprising a drive motor designed to convert provided electric or fluidic energy into a movement of a motor element, further comprising a drive sensor assigned to the drive motor and designed to detect the movement of the motor element and to provide a drive sensor signal, and further comprising a transmission device coupled to the drive motor and designed to convert the movement of the motor element into a drive movement of a drive element, wherein the transmission device is assigned to a movement sensor for the detection of the drive movement, the movement sensor being electrically connected to the drive sensor, wherein the movement sensor is assigned a detection device designed for the detection of component data and for the provision of detected component data to the movement sensor, wherein the movement sensor is designed to provide movement sensor signals and component data to the drive sensor and the drive sensor comprises a sensor data interface designed to provide drive sensor signals and movement sensor signals and component data to a higher-level controller.

With the aid of the detection device, component data of those components which are assigned to the detection device are to be detected. Such component data may, for example, be a general type designation of the component and/or an individual, preferably unique, identification of the respective component. In any case, one of the components which are assigned such a detection device is the transmission device coupled to the drive motor. Accordingly, the component data are, for example, a type designation of the transmission device and/or one or more technical properties of this transmission device, such as a step-up or step-down ratio, a maximum speed, a maximum temperature, a maximum torque or the like. The detection device is assigned to the movement sensor in such a way that the component data detected by the detection device can be made available to the movement sensor in an electronic form. A cable connection is preferably provided between the detection device and the movement sensor. Alternatively, the detection device is designed as a part of the movement sensor, or it may involve a programme component (software) which can run in the movement sensor. The movement sensor is in turn designed to provide the movement sensor signals and the component data detected by the detection device to the drive sensor. A cable connection is preferably provided between the movement sensor and the drive sensor, so that data can be transmitted between the movement sensor and the drive sensor in a simple way. The movement sensor and the drive sensor are preferably equipped with corresponding data interfaces. Alternatively, a wireless link can be provided between the movement sensor and the drive sensor, in particular in accordance with a standardised transmission protocol for wireless data transmission, such as Bluetooth or ZigBee. The drive sensor comprises a sensor data interface, where the drive sensor signals detected by the drive sensor and the movement sensor signals and component data transmitted by the movement sensor can be made available to a higher-level controller. The higher-level controller is typically a motor controller, if the drive motor is designed to convert electric energy, or a valve bank comprising a combination of fluid, in particular pneumatic, valves and input/output modules, so that fluidic energy can be made available to the suitably designed drive motor via valves of the valve bank. In this case, the signals at the sensor signal interface of the drive sensor can be detected with the aid of an input module which is in turn connected to other components of the valve bank via a multipole communication system or an internal bus system. As a result, the valves can be selected properly for controlling the drive motor on the basis of the drive sensor signals, movement sensor signals and component data provided.

Advantageous further developments of the invention are the subject matter of the dependent claims.

It is expedient if the movement sensor is designed for a transmission of movement sensor signals and component data to the drive sensor in accordance with a presettable data transmission protocol, in particular IO Link. Movement sensors are usually designed to provide a switching signal, which can also be understood as a digital switching signal, or an analogue signal, which is output as an electric voltage or current, for example, and is in the illustrated embodiment proportional to a position of a motor element relative to a motor housing. The movement sensor for the drive device according to the invention has to provide component data to the drive sensor in addition to its movement sensor signal. Accordingly, it is advantageous if a communication between the movement sensor and the drive sensor is provided in accordance with a presettable data transmission protocol, in particular in accordance with a digital data transmission protocol. It is preferably provided that the IO Link protocol is used as a data transmission protocol, this being a pointto-point connection. The drive sensor is preferably designed as IO Link master, while the movement sensor is in this case designed as IO Link device.

In a further development of the invention, it is provided that the movement sensor is designed for a reception of parameter data for the parameterisation of the movement sensor and/or the detection device from the drive sensor in accordance with a presettable data transmission protocol, in particular IO Link. It may for example be provided that the movement sensor detects the component data in a first step and transmits them to the drive sensor, from where the component data are transferred to a higher-level controller. In a second step, the higher-level controller makes available suitable parameters as a function of the detected component data, in order to perform an advantageous detection of the movement of the drive element by suitable parameterisation of the movement sensor. In addition, a parameterisation of the detection device can be provided in such a way that it repeats the detection of the component data at regular intervals and is deactivated for the rest of the time for as low an energy consumption as possible. It is particularly preferred if parameters are transmitted from the higher-level controller to the movement sensor within the framework of the IO Link protocol.

It is preferably provided that the drive sensor comprises a processing device designed to process drive sensor signals, movement sensor signals and component data and to provide a signal dataset in accordance with a presettable data transmission protocol, in particular SSI, at the sensor data interface. This facilitates an incorporation of the drive device into different environments, in which the same data transmission protocol is preferably used for a communication between the drive sensor and the higher-level controller. The controller may, for example, be an electric motor controller or an electropneumatic valve bank, wherein the necessary data communication between the drive device and the controller is in each case made possible with the aid of the presettable data transmission protocol. A data transmission protocol according to the SSI standard (synchronous serial interface) is preferably used, whereby up to three sensors, in particular of a position sensing system, can be connected to the higher-level controller in a simple way.

In a further development of the invention, it is provided that the drive sensor comprises a memory device designed to buffer drive sensor data and/or movement sensor data and/or parameter data. The memory device is preferably designed as a part of a processing device of the drive sensor. This processing device can in turn be designed as a microcontroller or microprocessor in particular. With the aid of the memory device, parameters made available by the higher-level controller can be stored for use by the processing device. After a temporary interruption of the supply voltage for the drive sensor, the stored parameters can once again be made available from a preferably non-volatile memory. It can further be provided that the memory device buffers one or more signals of the drive sensor and/or of the movement sensor in order to form, for example from several consecutively detected sensor signals, a common sensor signal, in particular by using statistical methods. In addition or as an alternative, the memory device can be used for the temporary or permanent storage of component data which have been detected by the detection device and can be made available via the sensor data interface of the drive sensor at regular intervals or in response to a request.

It is expedient if the detection device is designed to detect the component data by processing movement sensor signals and comparing the detected movement sensor signals to presettable movement sensor signal patterns and/or comparing them to drive sensor signals. It can for example be provided that the detection device has its own processing device in which presettable movement sensor signal patterns are stored and compared to detected movement signals. For this purpose, it is provided that movement sensor signals are transmitted from the movement sensor to the detection device in order to be able to deduce from the transmitted movement sensor signal properties of the component scanned with the aid of the detection device and the movement sensor. From a chronological development of a signal level of the movement sensor signal and, if applicable, of a further signal level of a likewise available drive sensor signal it is, for example, possible to draw conclusions on the respectively used component in order to derive, by comparison to preset movement sensor signal patterns, a specific property of the component, in particular a type designation. The component data can then be transmitted to the higher-level controller. In addition or as an alternative, it can be provided that movement sensor signals and drive sensor signals are compared in the detection device in order to draw conclusions on component data of the monitored component in this way.

In a further development of the invention, it is provided that the detection device comprises an RFID reading unit for a wireless detection of component data, and that the transmission device is assigned an RFID element (RFID tag) in which component data are stored. The RFID reading unit may, for example, be a combined transmitting and receiving unit for transmitting and receiving electromagnetic waves. Using this, RFDI elements assigned to the transmission device and/or to other components can be read out by providing that the electromagnetic waves sent out by the RFID reading unit are changed in a characteristic way and reflected back by the RFID elements, which can be detected by the RFID reading unit. It can optionally be provided that only a type designation or a unique identification number of the component provided therewith is stored in the respective RFID element. Alternatively, it can be provided that concrete data, in particular technical properties, such as a transmission ratio and/or a maximum speed and/or a maximum torque loading for the component equipped with the RFID element, are stored in the RFID element as well.

It is preferably provided than a higher-level controller, in particular a motor controller, is connected to the sensor data interface of the drive sensor, and that the controller is designed for the open- or closed-loop control of the drive motor as a function of drive sensor signals and/or movement sensor signals and/or component data and/or parameter data.

It is expedient if the higher-level controller comprises an input interface, in particular a computer interface, designed for the connection of a parameterisation unit, and if the input interface is in particular designed as a web server for outputting and/or receiving parameter data. With the aid of the input interface, a parameterisation unit, in particular a personal computer, can be connected to the higher-level controller for a parameterisation of the drive device. It can preferably be provided that, when connecting the parameterisation unit to the higher-level controller, the component data detected by the detection device are first made available to the parameterisation unit, in order to be able to provide, by accessing an internal or external data base, in particular via a wired or wireless link, setting data, in particular parameters, for the parameterisation of the drive device. In a subsequent step, the available parameters can be transferred via the sensor data interface to the drive sensor and from there to the movement sensor and the detection device.

It is particularly advantageous if the input interface is assigned a web server, so that a preset user interface adapted to the requirements of the higher-level controller and of the connected sensors, such as the drive sensor and the movement sensor, is made available. The required input facilities and their graphic representation are predetermined by the web server assigned to the input interface and only have to be depicted on the parameterisation unit. Accordingly, there is no need for installing special software on the parameterisation unit, which only has to be capable of showing a web site, in particular by means of a web browser.

It is preferably provided that the transmission device comprises several function-coupled transmission components, in particular a reduction gear and a spindle gear and that at least two transmission components are equipped with a detection device each. Drive devices are frequently constructed in a modular fashion for adaptation to different application conditions to facilitate their adaptation to the desired conditions. For this purpose, it can be provided that a series circuit of several transmission components can be connected to the drive motor, for example a reduction gear for reducing speed and increasing torque and a downstream spindle gear for converting a rotary movement into a translational movement. Depending on application, differently designed members are available from the reduction gear family and the spindle gear family; these can be combined more or less freely. To ensure a complete detection of the properties of the drive device, it is preferably provided that each of these transmission components is assigned a detection device designed to detect the component data of the respective transmission component and to transfer them to a preferably separate movement sensor, from where in each case a data link to the drive sensor of the drive motor is formed.

BRIEF DESCRIPTION OF THE DRAWINGS

An advantageous embodiment of the invention is shown in the drawing, of which:

FIG. 1 is a diagrammatic representation of a drive device with a drive motor, a first and a second transmission component and movement sensors with integrated detection devices, which are assigned to the respective transmission components.

DETAILED DESCRIPTION OF THE PREFERRED EMBODIMENTS

The single FIGURE shows a drive device 1 and a higher-level controller 2, which together form a drive system 3, by means of which a machine component not shown in the drawing can be moved in a linear motion between at least two functional positions. In the illustrated embodiment, the drive device 1 is designed as an electric drive device. Accordingly, a drive motor 4 is supplied with electric energy by the higher-level controller 2 via a supply line 5 and can, if suitably supplied with electric energy, cause a movement of a motor element 30 designed as a rotating motor shaft in the illustrated embodiment. The motor element 30 is coupled to a first transmission component 6, which may for example be a planetary gear train for reducing the speed of the rotary movement of the motor element 30. The motor element is provided with a pinion 31 serving as the sun gear of the planetary gear train, with which engage several planet gears 32 arranged radially on the outside and rotatably mounted in a fixed location. The planet gears 32 in turn engage with a radially outward ring gear 33, which is coupled to a drive shaft 34 coupled to a second transmission component 7, this being a spindle drive in the illustrated embodiment.

The second transmission component 7 converts a rotary movement of the drive shaft 34 into a translational movement. For this purpose, the drive shaft 34 is non-rotatably coupled to a threaded spindle 35 rotatably accommodated in a fixed location in a housing 36. A clam nut 37 capable of linear movement and non-rotatably installed in the housing 36 is screwed onto the threaded spindle 35. The clam nut 37 is in turn coupled to a push rod 8, which projects from the second transmission component 7 in an end region thereof which is remote from the drive motor 4 and which is provided to make available a linear movement to a machine component not shown in the drawing. With the aid of the transmission components 6 and 7, a rotary movement of the motor element 30 can be converted into a linear movement of the push rod 8, the first transmission component 6 reducing the speed of the rotary movement of the motor element 30 by means of the planetary gear train and the second transmission component 7 converting the rotary movement of the drive shaft 34 into a linear movement of the push rod 8.

On a side of the drive motor 4 which is remote from the transmission components 6 and 7, a drive sensor 9 is mounted, which is coupled to the drive motor 4 for detecting a rotary movement of the motor element 30 and outputting a drive sensor signal. For this purpose, the drive sensor 9 comprises a sensor data interface 10, to which a sensor line 11 is connected for an electric transmission of the drive sensor signals to the higher-level controller 2. Furthermore, further sensor lines 12, 13, 14 and 15, which are connected to movement sensors 16, 17, 18 and 19, are connected to the sensor data interface 10. The movement sensors 16 to 19 can be designed differently; the movement sensor 16 assigned to the first transmission component 6, for example, can be designed as a sensor for the detection of rotary movements of the planet gears 32. The movement sensors 17 and 19, on the other hand, are designed as limit switches with the aid of which two end positions of the clam nut can be determined within the spindle drive of the second transmission component 7. The movement sensors 17 and 19 are magnetic sensors, in particular Hall sensors, for example, which react to a permanent magnet mounted on the clam nut as soon as this is close to the respective movement sensor 17 or 19. The movement sensor 18 of the illustrated embodiment is an electromechanically designed reference switch, which is, for example, used in an initialisation of the drive device 1 and which is only in special cases designed for a concrete detection of the axial position of the clam nut (not shown) of the spindle drive of the second transmission component 7.

In the illustrated embodiment, an RFID label 20, on which the component data of the first transmission component 6 are stored, is attached to the first transmission component 6. The movement sensor 16 of the illustrated embodiment is provided with an RFID reader not shown in detail, which is designed to emit electromagnetic waves which are reflected by the RFID label 20, wherein within this reflection process the electromagnetic waves emitted by the movement sensor 16 are changed, and wherein this change of the reflected electromagnetic waves represents the data content stored in the RFID label 20. The reflected electromagnetic waves can be detected by a suitable aerial in the movement sensor 16 and can thus be used for the detection of component data of the first transmission component 6.

The movement sensors 17 and 19, on the other hand, are used for the detection of the end positions of the clam nut 37 within the housing 36. For this purpose, each of the two movement sensors 17 and 19 can comprise a Hall sensor designed to detect a magnetic field strength of a permanent magnet 38 assigned to the clam nut 37. In the illustrated embodiment, the movement sensors 17 and 19 are designed to output a switching signal if a presettable threshold value for the magnetic field strength of the permanent magnet 38 is exceeded, in order to indicate that the clam nut 37 has reached the desired end position. In addition the movement sensors 17 and 19 can be configured for processing the signal level of the respective Hall sensor, which changes as a result of the movement of the permanent magnet 38. By including drive sensor signals and/or signals of the movement sensor 16 assigned to the first transmission component 6, the properties of the transmission device 21 formed from the first transmission component 6 and the second transmission component 7 can be determined in the movement sensors 17, 19.

It is preferably provided that a memory device in which different movement sensor signal patterns are stored for different transmission devices 21 compiled from the transmission components 6 and 7 is formed in each of the movement sensors 17 and 19. By comparing the actually received movement sensor signals to the stored movement sensor signal patterns, the component data for the second transmission component 7 can be determined.

The movement sensor signals and the component data detected by the respective movement sensors 16, 17 and 19 can be made available to the drive sensor 9 via the respectively assigned sensor lines 12, 13, 15. For a communication between the movement sensors 16 to 19 and the drive sensor 9 via the sensor lines 12 to 15, communication in accordance with the IO Link data transmission standard is preferably provided. The drive sensor 9 here preferably represents the IO Link master, while the movement sensors 16 to 19 are designed as IO Link devices. In technical terms, in the use of the IO Link data transmission protocol, a point-to-point data link via which the desired movement sensor signals and, if applicable, component data can be transmitted is built up between each of the movement sensors 16 to 19 and the drive sensor 9. It can furthermore be provided that parameters can be transmitted from the drive sensor 9 to the respective movement sensors 16 to 19 and the associated detection devices.

A communication between the drive sensor 9 and the higher-level controller 2 via the sensor line 11 can, for example, be provided in accordance with the SSI data transmission standard, wherein both the movement sensor signal data and the component data as well as the drive sensor signals can be transmitted via this sensor line 11. Furthermore, parameters to be transmitted from the higher-level controller 2 to the drive sensor 9 can be transmitted as well. It can, for example, be provided that the higher-level controller 2 has in input interface 22, which may be an UBS interface as used in personal computers, for example. This input interface 22 facilitates the connection of a personal computer 23 to the higher-level controller 2 for a parameterisation of the drive device 1 or the drive system 3 respectively. For this purpose, the higher-level controller 2 preferably comprises a web server assigned to the input interface 22, the web server offering a complete graphic user interface according to one of the common web-based standards, in particular HTML, and if the personal computer 23 is connected to the input interface 22, a complete parameterisation environment is created for the drive system 3 on the personal computer 23, using a common web browser in particular.

For a parameterisation of the drive system 3, the following procedure can be provided: in a first step, electric energy is provided by the higher-level controller 2 to the drive device 1, supplying the drive sensor 9 and the movement sensors 16 to 19 with electric energy in particular. In addition, electromagnetic waves are provided by the movement sensor 16 for a non-contact readout of the RFID label 20 assigned to the first transmission component 6. It is preferably provided that a type designation for the first transmission component 6, which can be transmitted by reflecting the electromagnetic waves emitted by the movement sensor 16 and received by the movement sensor 16, is stored in the RFID label 20. The movement sensor 6 can transfer the received component data via the associated sensor line 12 to the drive sensor 9. This information via the first transmission component 6 is, however, not enough for a complete characterisation of the drive system 3. On the contrary, data on the second transmission component 7 are required as well. This, however, requires an activation of the drive motor 4 by the higher-level controller 2. For this purpose, the component data detected by the movement sensor 16, which are made available to the drive sensor 9 via the sensor line 12, as well as drive sensor data and motor data, if applicable, which are stored in a memory of the drive sensor 9, are transmitted to the higher-level controller 2 via the sensor line 11. On the basis of this information, the controller 2 can provide an initialising mode for the drive device 1, in which, for example, the second transmission component 7 is made to move with a slow motion of the drive motor 4 in such a way that the push rod 8 adopts an end position in which a reference information can be transmitted from the movement sensor 18 to the drive sensor 9. In the course of this movement of the push rod 8 and the clam nut 37 coupled thereto, the magnetic field of the permanent magnet 38 assigned to the clam nut 37, which acts on the two movement sensors 17 and 19, changes with time.

By processing the signal levels of the respective movement sensors 17 and 19, including the drive sensor signals of the drive sensor 9, the movement sensors 17, 19 can draw conclusions about a movement characteristic of the second transmission component 7, which is correlated to stored movement sensor signal patterns in the respective movement sensors 17 and 19 in order to determine the required component data by processing this information. These component data can then be made available to the drive sensor 9 via the respective sensor lines 13 and 15 and from there transferred to the higher-level controller 2. After this initialisation step, the higher-level controller 2 has full knowledge about the additional components connected to the drive motor 4, such as the drive sensor 9, the first and second transmission components 6 and 7 and the movement sensors 16 to 19.

Accordingly, if a personal computer 23 is now connected to the input interface 22, a graphic user interface enabling the user to adapt the drive system 3, in particular the drive device 1, to the requirements of the current movement function can be provided by using the web server, which is preferably formed in the higher-level controller 2. For this purpose, individual parameters can for example be selected for the higher-level controller 2 and the drive motor 4. In addition, the sensors, i.e. the drive sensor 9 and the movement sensors 16 to 19, can be parameterised, for example to determine switching positions for the movement sensors 17 and 19, which are designed as limit switches.

In addition or as an alternative, it can be provided that, before a parameterisation with the aid of the personal computer 23 serving as a programming tool, a data transmission is established from the personal computer 23 to a data server of the producer of the drive system 3 via a wired or wireless network link, in order to facilitate a check of the detected component data. If this check has a positive result, the desired parameterisation, in particular using presettable parameter sets provided by the producer of the drive system 3, can now be performed. If an error message occurs during the check of the component data, it is first possible to analyse on which observation of the drive system 3 the error message is based and then to take suitable troubleshooting measures.

Following its parameterisation, the drive system 3 can be set to regular operation for performing its movement function with the aid of the drive device 1 and the higher-level controller 2. In addition, it may be provided that the component data are determined at regular or irregular intervals with the aid of the movement sensors 16 to 19, for example to detect deviations from original values for the movement sensor signals or the drive sensor signals and to draw from any such deviations conclusions on a possible wear of the drive system 3. In this context, it may optionally be provided that the respective movement sensor signals and drive sensor signals are processed in the drive sensor 9 or in the higher-level controller 2.

The processing operation is preferable performed in the higher-level controller 2, but a storage of the results can in addition or as an alternative be provided both in the higher-level controller 2 and in the drive sensor 9, wherein storage in the drive sensor 9 ensures a direct assignment of the obtained data to the drive device 1, so that these data remain available even if the higher-level controller 2 is replaced.

The invention claimed is:

1. A drive device for providing a drive movement, comprising a drive motor designed to convert provided electric or fluidic energy into a movement of a motor element, further comprising a drive sensor assigned to the drive motor and designed to detect the movement of the motor element and to provide a drive sensor signal, and further comprising a transmission device coupled to the drive motor and designed to convert the movement of the motor element into a drive movement of a drive element, wherein the transmission device is assigned a movement sensor for the detection of the drive movement, the movement sensor being electrically connected to the drive sensor, and wherein the movement sensor is assigned a detection device designed for the detection of component data and for the provision of detected component data to the movement sensor, wherein the movement sensor is designed to provide movement sensor signals and component data to the drive sensor and the drive sensor comprises a sensor data interface designed to provide drive sensor signals and movement sensor signals and component data to a higher-level controller.

2. The drive device according to claim 1, wherein the movement sensor is designed for a transmission of movement sensor signals and component data to the drive sensor in accordance with a presettable data transmission protocol.

3. The drive device according to claim 2, wherein the presettable data transmission protocol is IO Link.

4. The drive device according to claim 2, wherein the presettable data transmission protocol is SSI.

5. The drive device according to claim 1, wherein the movement sensor is designed for a reception of parameter data for the parameterisation of the movement sensor and/or the detection device from the drive sensor in accordance with a presettable data transmission protocol.

6. The drive device according to claim 1, wherein the drive sensor comprises a processing device designed to process drive sensor signals, movement sensor signals and component data and to provide a signal dataset in accordance with a presettable data transmission protocol at the sensor data interface.

7. The drive device according to claim 1, wherein the drive sensor comprises a memory device designed to buffer drive sensor data and/or movement sensor data and/or parameter data.

8. The drive device according to claim 1, wherein the detection device is designed to detect the component data by processing movement sensor signals and comparing the detected movement sensor signals to presettable movement sensor signal patterns and/or comparing them to drive sensor signals.

9. The drive device according to claim 1, wherein the detection device comprises an RFID reading unit for a wireless detection of component data, and wherein the transmission device is assigned an RFID element in which component data are stored.

10. The drive device according to claim 1, wherein a higher-level controller is connected to the sensor data interface of the drive sensor, and wherein the controller is designed for the open- or closed-loop control of the drive motor as a function of drive sensor signals and/or movement sensor signals and/or component data and/or parameter data.

11. The drive device according to claim 10, wherein the higher-level controller comprises an input interface designed for the connection of a parameterisation unit, and wherein the input interface is designed for outputting and/or receiving parameter data.

12. The drive device according to claim 11, wherein the input interface is a computer interface.

13. The drive device according to claim 11, wherein the input interface is designed as a web server.

14. The drive device according to claim 10, wherein the higher-level controller is a motor controller.

15. The drive device according to claim 1, wherein the transmission device comprises several function-coupled transmission components and wherein at least two transmission components are equipped with a detection device each.

16. The drive device according to claim 15, wherein the function-coupled transmission components include a reduction gear and a spindle gear.

* * * * *